Patented Nov. 25, 1924.

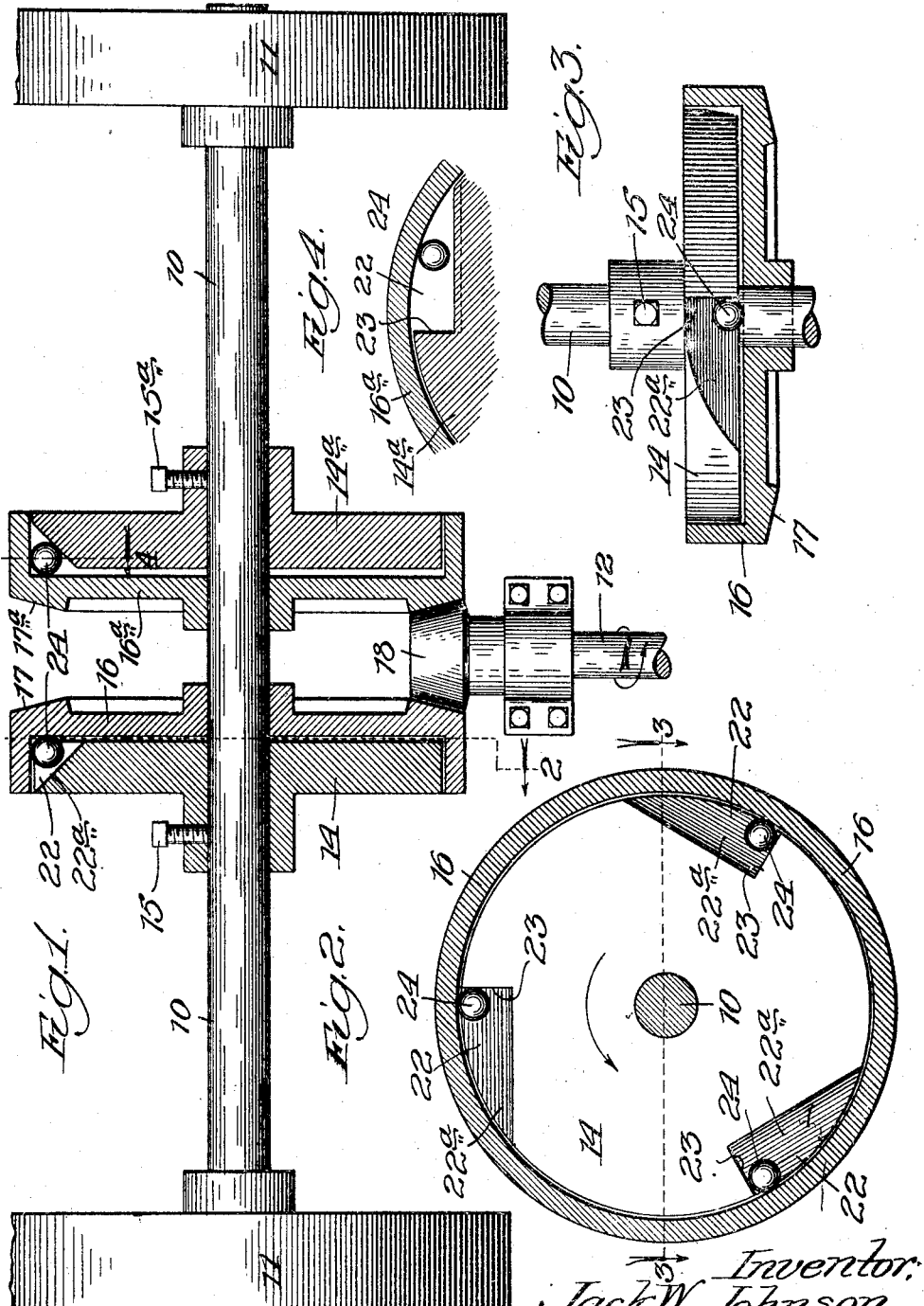

1,516,734

UNITED STATES PATENT OFFICE.

JACK W. JOHNSON, OF CHICAGO, ILLINOIS, ASSIGNOR TO RADIO VACUUM CLEANER COMPANY, OF ST. CHARLES, ILLINOIS, A CORPORATION OF ILLINOIS.

CLUTCH.

Application filed November 26, 1923. Serial No. 676,994.

*To all whom it may concern:*

Be it known that I, JACK W. JOHNSON, a citizen of the United States, residing at Chicago, in the county of Cook and State of Illinois, have invented a new and useful Improvement in Clutches, of which the following is a specification.

This invention relates to improvements in clutches and more particularly to that type of clutch frequently referred to as an automatic or over running clutch, in which a continuously rotating driving shaft will operate to rotate a driven shaft and, at the same time, permit the driven shaft to freely rotate faster than the driving shaft or permit the driving shaft to freely rotate in reverse direction. By the use of two such clutches it is possible to cause a reciprocating rotatable driving shaft to turn a driven shaft continuously in one direction. By the use of my improved clutch, or clutches, great efficiency and smoothness of running is obtained. My improved clutch is so made that it may be easily and cheaply constructed, and is also smooth running and practically noiseless in operation. It is also strong and durable and requires the minimum amount of care, adjustment, and maintenance. Other features and advantages of my improved clutch will appear more fully as I proceed with my specification.

In that form of device embodying the features of my invention shown in the accompanying drawings, Fig. 1 is a horizontal sectional view showing two clutches arranged on a reciprocating driving shaft adapted to drive a driven shaft continuously in one direction;

Fig. 2 is a view taken as indicated by line 2 of Fig. 1;

Fig. 3 is a view taken as indicated by line 3 of Fig. 2;

Fig. 4 is a view taken as indicated by line 4 of Fig. 1.

For the purpose of illustrating the invention and as a sample of one of the uses to which my improved clutch may be put, I have here shown two clutches arranged in connection with a reciprocating driving shaft which may be the shaft connecting two wheels of a carpet sweeper. Since the carpet sweeper in operation is ordinarily pushed to and fro, it is obvious that this shaft will not rotate continuously in one direction, but will reciprocate. The clutches are attached to this shaft in order to drive another shaft continuously in one direction. For example, this continuously driven rotating shaft may in turn operate a fan-blower or suction pump in order to form a vacuum to be used in connection with the operation of the sweeper. Although this one embodiment of the invention is shown, it is obvious, that my improved clutch, either singly, or with others of the same kind, may be used in a variety of ways without departing from the scope of my invention.

As shown in the drawings, 10 indicates a driving shaft having on its ends the two wheels 11, here shown as two wheels of a vacuum cleaner adapted for operation to and fro over a surface to be cleaned. 12 indicates a driven shaft which is given a continuous rotation in one direction by the reciprocating or reversing rotation of the shaft 10. In a vacuum cleaner, the shaft 12 is adapted to drive a fan or suction pump (not shown). The drawings show the shaft 10 as rotating at the present moment in the direction indicated by the arrow in Fig. 2.

The shaft 10 carries the two driving disks 14 and $14^a$ held on the shaft by means of the set screws 15 and $15^a$. Slidably and rotatably mounted on the shaft 10 in connection with each of the driving disks 14 and $14^a$ is a cup-shaped member. The cup-shaped member for the driving disk 14 is indicated by the reference numeral 16, and the other by the reference numeral $16^a$. Each of the cup-shaped members fits over its corresponding driving disk, as shown. Each of the cup-shaped members has at the periphery of its front face a beveled frictional surface adapted to engage the beveled friction wheel 18 on the end of the driven shaft 12. The two beveled friction rings or surfaces on the two cup-shaped members 16 and $16^a$ are indicated by 17 and $17^a$ respectively.

The parts are so constructed that rotation of the shaft 10 in the direction indicated by the arrow in Fig. 2 will lock the driving disk $14^a$ to the cup $16^a$ and, at the same time, force this cup into frictional engagement with the wheel 18 so that the friction surface $17^a$ will drive the wheel 18 and consequently the shaft 12 in a forward direction as indicated by the arrow in Fig. 1. When the shaft 10 is thus rotated, the cup 16 is permitted to slide slightly on the shaft 10 so that its surface 17 is out of frictional engagement with the wheel 18. At the same time, the cup 16 is not locked to the driving disk 14. When the direction of rotation of the shaft 10 is reversed, the cup 17 becomes locked to the driving disk 14 and pressed into frictional engagement with the wheel 18 and the cup 16$^a$ becomes unlocked from the driving disk 14$^a$ and moves out of frictional engagement with the wheel 18. It is to be noted that since the cup which is not at the moment driving the wheel 18 moves out of frictional engagement from this wheel that such cup is thereby prevented from being given a reverse rotation by the wheel 18 thus saving a great deal of friction and noise.

The construction and operation of the clutches will now be explained more in detail. It is to be understood that the disks 14 and 14$^a$ and their associated parts are similar, and I will therefore describe more in detail but one. The disk 14 is provided at its periphery with three recesses or cutaway parts 22. Each of these recesses is formed by a flat slanting cut 22$^a$ from the front face of the disk away from the center or outwardly to the rear face except that each cut is terminated at one side by a vertical shoulder 23. By a vertical shoulder I mean that the shoulder 23 is vertical to the surface of the face 22$^a$ formed by the slanting cut. The shoulders 23 are also substantially in radial relation to the disk 14. In each of the recesses thus formed is placed a ball 24 preferably made of hardened steel and small enough so that when the disk is rotated, in the direction indicated by the arrow in Fig. 2, the ball will roll back to the large end of the pocket and up against the shoulder 23 where it will not engage simultaneously all of the other three surfaces of the pocket. When in this position there will be no jamming and consequently no clutching action. When the rotation of the shaft is fast enough, the ball 24 will probably fly out against the circular wall of the cup-shaped member 16, as shown in Fig. 2. When in this position, it is to be noted that the ball, although shown in Fig. 2 as lying against the flat face of the cup 16, is not in engagement with the slanting surface 22$^a$. When in this position there will consequently be no wedging or jamming between the disk 14 and the cup-shaped member 16 with consequent locking of these members. When the balls are in this position it will be seen also that the cup 16 is free to move toward the disk 14 and out of frictional engagement with the wheel 18.

In other words, when the shaft 10 rotates in the direction indicated by the arrow in Fig. 2, the clutch composed of the members 14, 16, and associated parts runs freely and the cup 16 is not driven either by the wheel 18 or the driving disk 14. When the shaft 10 rotates in this direction the other clutch, that is the clutch comprising the members 14$^a$, 16$^a$, etc., is locked so that the disk 14$^a$ drives the cup 16$^a$ and this, in turn, the wheel 18. When the direction of rotation of the shaft 10 is reversed, the clutch 14, 16, engages and the other clutch 14$^a$, 16$^a$, is released.

The holding or engaging of the clutch takes place in the following manner. Assume that the shaft 10 is rotating in the direction indicated by the arrow in Fig. 2. In this case, the disk 14$^a$ rotates the cup 16$^a$. In other words, the clutch 14$^a$, 16$^a$ is engaged. This engagement is caused by the slanting face 22$^a$ engaging the ball 24 and wedging it outwardly and forwardly. The pressure of the slanting cut or face 22$^a$ pushes the ball up into the corner of the cup 16$^a$ (see Figs. 1 and 4). This pressure of the ball performs two functions. In the first place it so wedges between the disk 14$^a$ and the cup 16$^a$ as to lock these members and cause the disk 14$^a$ to drive the cup 16$^a$. In the second place, it forces the cup 16$^a$ longitudinally on the shaft 10 away from the disk 14$^a$, and forces the frictional surface 17$^a$ into frictional engagement with the friction wheel 18 so that the rotation of the cup 16$^a$ serves to drive the wheel 18. As stated before, when the direction of rotation of the shaft 10 is reversed, the balls between the members 14$^a$ and 16$^a$ are released from their jamming effect by the shoulders 23 so that the members 14$^a$ and 16$^a$ are unlocked and the cup 16$^a$ is at the same time permitted to move longitudinally on the shaft toward the driving disk 14$^a$ and out of frictional engagement with the friction wheel 18 on the shaft 12. When the direction of rotation of the shaft 10 is thus reversed, the balls between the members 14 and 16 of the other clutch jam causing the cup 16 to be rotated by the disk 14 and forced into frictional engagement with the friction wheel 18 on the shaft 12.

It is to be noted also that the angle of the slanting face 22$^a$ can be varied so that the proportion between the radial thrust and the axial thrust may be changed as desired.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new, and desire to secure by Letters Patent, is:

1. A clutch of the character described comprising; a driving shaft and a driven shaft; a driving disk on the driving shaft; a cup member slidably and rotatably mounted on the driving shaft and embracing said driving disk; a member mounted on the driven shaft and having a frictional surface; a frictional surface on the cup member adapted for frictional engagement with the frictional surface on the member mounted on the driven shaft; a recess in the driving disk provided with a slanting surface on one side and a square shoulder on the other; and a ball mounted in said recess whereby rotation of the driving disk in one direction will operate to cause a wedging of said ball between the slanting face of the recess in the disk and the cup member to cause said cup member to be rotated by said disk and moved longitudinally on the driving shaft to cause its frictional surface to frictionally engage the frictional surface on the member mounted on the driven shaft to cause rotation of the same.

2. A clutch of the character described comprising; a driving shaft and a driven shaft; a driving disk on the driving shaft; a cup member slidably and rotatably mounted on the driving shaft and embracing the driving disk; a member on the driven shaft adapted to be engaged by said cup member; and means operated by said driving disk whereby rotation of said disk in one direction will operate to rotate the cup member and move the same longitudinally on the driving shaft away from the disk, and rotation of said disk in the opposite direction will disengage said disk from said cup member and permit said cup member to slide longitudinally on the driving shaft toward said disk.

3. A clutch of the character described comprising; a driving shaft; a driving disk mounted on the driving shaft; a cup member slidably and rotatably mounted on the driving shaft and embracing the driving disk; and means operated by the driving disk whereby rotation of the same in one direction will operate to rotate the cup member therewith and force the same away from the driving disk and rotation of the disk in the opposite direction will free said cup member from rotation and permit the same to slide on the shaft toward said driving disk.

4. A clutch of the character described comprising; a driving shaft; a driving disk on the driving shaft; a cup member slidably and rotatably mounted on the driving shaft and embracing the driving disk; a recess at the periphery of the driving disk formed by a slanting cut from the front face of the disk outwardly to the rear face, said cut being terminated at one end by a vertical shoulder; and a ball within said recess.

5. A device of the character described comprising; a reciprocating rotatable driving shaft; a driven shaft; two driving disks mounted on the driving shaft; two cup members slidably and rotatably mounted on the driving shaft one embracing each driving disk; a member mounted on the driven shaft and having a frictional surface, a frictional surface on each cup member adapted for frictional engagement with the frictional surface on the member mounted on the driven shaft and means operated by the driving disks whereby rotation of the driving shaft in one direction will operate to rotate one of the cup members and force the same into frictional engagement with the frictional surface on the member mounted on the driving shaft, and rotation of the driving shaft in the opposite direction will cause rotation of the other cup member and force it into frictional engagement with the frictional surface on the member mounted on the driven shaft.

6. A device of the character described comprising; a reciprocating rotatable driving shaft; a driven shaft; two driving disks mounted on the driving shaft; two cup members slidably and rotatably mounted on the driving shaft between the driving disks, one cup member embracing each driving disk; frictional driving surfaces on the opposed faces of the cup members; a friction wheel on the driven shaft lying between the frictional surfaces on the cup members; and means whereby rotation of the driving shaft in one direction will cause rotation of one of the cup members and force the same into frictional driving engagement with the friction wheel on the driven shaft, and rotation of the driving shaft in the opposite direction will cause rotation of the other cup member and force the same into frictional driving engagement with the friction wheel on the driven shaft.

7. A device of the character described comprising; a reciprocating rotatable driving shaft; a driven shaft; two driving disks mounted on the driving shaft; two cup members slidably and rotatably mounted on the driving shaft between the driving disks, one embracing each driving disk; frictional driving surfaces on the opposed faces of the cup members; a friction wheel on the driven shaft lying between the frictional driving surfaces of the cup members, said cup members adapted to have their frictional driving surfaces moved into or out of engagement with the friction wheel on the driven shaft by sliding movement on the driving shaft; a recess in the periphery of each driving disk formed by a flat slanting cut from the front face outwardly to the rear face and terminated at one end by a vertical shoulder; and a ball in each of such recesses, said ball being confined therein by the cup members.

8. A clutch of the character described comprising; a driving shaft; a driven shaft; a friction wheel on the driven shaft; a driving disk on the driving shaft; a cup member slidably and rotatably mounted on the driven shaft and embracing the driving disk, said cup member having a frictional driving surface adapted to be brought into or out of engagement with the friction wheel on the driven shaft by a sliding movement of said cup member on the driving shaft; a recess in the periphery of the driving disk formed by a slanting cut, from the front face outwardly to the rear face thereof and terminated at one end by a vertical shoulder; and a ball lying in said recess and confined therein by the cup member, whereby rotation of the driving disk in one direction will force the ball in the recess against the cup member to cause rotation of the same and force the same away from the driving disk into frictional engagement with the friction wheel on the driven shaft, and rotation of said driving shaft in the opposite direction will cause the shoulder at one end of the recess in its periphery to engage the ball to release the same from its jamming effect to free the cup member from rotation and, at the same time, permit it to be slidably moved on the driving shaft to move its frictional driving surface out of frictional engagement with the friction wheel on the driven shaft.

9. A clutch of the character described comprising; a driving shaft; a driven shaft; a driving disk on the driving shaft; a driving wheel on the driven shaft; a cup member slidably and rotatably mounted on the driving shaft and embracing the driving disk, said cup member having a driving surface adapted to be brought into driving engagement with the driving wheel on the driven shaft by sliding movement of said cup member on said driving shaft; and means whereby rotation of said driving disk in one direction will operate to rotate the cup member and slide the same on the driving shaft to bring its driving surface into driving engagement with the driving wheel on the driven shaft, and rotation of said driving disk in the opposite direction will free said cup member from rotation and permit it to slide on the driving shaft to move its driving surface out of driving engagement with the driving wheel on the driven shaft.

10. A clutch of the character described comprising; a driving shaft; a driven shaft; a driving disk on the driving shaft; a driving wheel on the driven shaft; a cup member slidably and rotatably mounted on the driving shaft and embracing the driving disk, said cup member having a driving surface adapted to be brought into driving engagement with the driving wheel on the driven shaft by sliding movement of said cup member on said driving shaft; a recess at the periphery of the driving disk formed by a slanting cut from the front face outwardly to the rear face thereof and terminated at one end by a vertical shoulder; and a ball lying in said recess and confined therein by the cup member.

11. A clutch of the character described comprising; a driving shaft; a driven shaft; a driving wheel on the driven shaft; a driving disk mounted on the driving shaft; a cup member slidably and rotatably mounted on the driving shaft and embracing the driving disk, said cup member having a driving surface adapted to be moved into or out of engagement with the driving wheel on the driven shaft by sliding movement of said cup member on said driving disk; a recess in the periphery of the driving disk; and a ball confined in said recess by the cup member; said recess so formed that rotation of the driving disk in one direction will operate to jam the ball between the driving disk and the cup member to rotate said cup member and at the same time force the same away from the driving disk to bring its driving surface in driving engagement with the driving wheel on the driven shaft, and rotation of the driving disk in the opposite direction will operate to release said ball from said jamming effect to free the cup member from rotation and permit the same to slide on the driving shaft to move the driving surface thereon out of driving engagement with the driving wheel on the driven shaft.

12. A clutch of the character described comprising; a driving shaft; a driving disk on the driving shaft; a cup member slidably and rotatably mounted on the driving shaft and embracing the driving disk; a recess in the periphery of the driving disk; a ball confined in said recess by the cup member; said recess being so formed that rotation of the driving disk in one direction will jam said ball between the driving disk and the cup member to cause rotation of the cup member and at the same time force said cup member slidably on the driving shaft away from the driving disk, and rotation of the driving disk in the opposite direction will free said cup member from rotation and permit the same to slide on the driving shaft toward said driving disk.

13. A clutch comprising a cup, a ball adapted to roll along the cove between the bottom and side of the cup, a member in the cup and rotatable about the longitudinal axis of the latter, said member having an inclined clutch face adapted to engage with said ball and force it against both the bottom and the side of the cup when said member is turned in one direction and permit it to drop away therefrom when said member is turned in the opposite direction.

14. A clutch comprising a cup, a member arranged in said cup and rotatable about the longitudinal axis of the latter, said member having a recess at its periphery formed by a substantially flat surface receding from said axis and slanting from the front to the rear of said member and another surface substantially at right angles thereto, and a ball confined in said recess by the adjacent portions of the bottom and side of the cup.

In witness whereof, I have hereunto set my hand and seal this 21st day of November, 1923.

JACK W. JOHNSON [L. S.]